US008718393B2

(12) United States Patent
Chen et al.

(10) Patent No.: US 8,718,393 B2
(45) Date of Patent: May 6, 2014

(54) METHOD FOR RECONSTRUCTION OF URBAN SCENES

(75) Inventors: Baoquan Chen, Guangdong (CN); Liangliang Nan, Guangdong (CN); Qian Zheng, Guangdong (CN)

(73) Assignee: Shenzhen Institutes of Advanced Technology Chinese Academy of Sciences, Guangdong (CN)

( * ) Notice: Subject to any disclaimer, the term of this patent is extended or adjusted under 35 U.S.C. 154(b) by 544 days.

(21) Appl. No.: 12/935,685

(22) PCT Filed: Jul. 28, 2010

(86) PCT No.: PCT/CN2010/007552
§ 371 (c)(1),
(2), (4) Date: Sep. 30, 2010

(87) PCT Pub. No.: WO2012/012943
PCT Pub. Date: Feb. 2, 2012

(65) Prior Publication Data
US 2012/0243774 A1    Sep. 27, 2012

(51) Int. Cl.
*G06K 9/40* (2006.01)
(52) U.S. Cl.
USPC ........... 382/254; 382/157; 382/159; 382/190; 382/199; 382/206; 382/255; 382/256; 382/266; 382/274; 382/275
(58) Field of Classification Search
None
See application file for complete search history.

(56) References Cited

U.S. PATENT DOCUMENTS

| | | | |
|---|---|---|---|
| 7,881,913 B2 * | 2/2011 | Smith et al. | 703/2 |
| 8,045,770 B2 * | 10/2011 | Reeves et al. | 382/128 |
| 8,224,069 B2 * | 7/2012 | Nakajima | 382/154 |
| 8,275,194 B2 * | 9/2012 | Zebedin | 382/154 |
| 8,463,024 B1 * | 6/2013 | Gallup et al. | 382/154 |
| 8,467,606 B2 * | 6/2013 | Barton | 382/173 |
| 8,525,848 B2 * | 9/2013 | Janson | 345/606 |
| 8,542,911 B1 * | 9/2013 | Korobkin | 382/154 |
| 8,564,607 B2 * | 10/2013 | Lee et al. | 345/582 |
| 2010/0201682 A1 * | 8/2010 | Quan et al. | 345/419 |
| 2012/0243774 A1 * | 9/2012 | Chen et al. | 382/154 |

OTHER PUBLICATIONS

Wang, Recovering Facade Texture and Microstructure from real World Images, 2002, International Workshop, pp. 145-149.*
Completion and Reconstruction with Primitive Shapes, Schnabel, Eurographics, 2009.*
Non-local Scan Consolidation for 3D Urban Scenes, Zheng.*
New Methods for Digital Modeling of Historic Sites, Peter Allen, 3D reconstruction and Visualization, 2003 IEEE.*
Wang, Recovering Facade Texture and Microstructure from Real Workd images, 2002, International Workshop pp. 145-149.*
Schnabel, Completion and Reconstruction with Primitive Shapes, 2009, Eurographics.*

(Continued)

*Primary Examiner* — Jayesh A Patel
*Assistant Examiner* — Iman K Kholdebarin
(74) *Attorney, Agent, or Firm* — Rosenberg, Klein & Lee

(57) ABSTRACT

An urban scenes reconstruction method includes: acquiring digital data of a three-dimensional subject, the digital data comprising a 2D photograph and a 3D scan; fusing the 3D scan and the 2D photograph to create a depth-augmented photograph; decomposing the depth-augmented photograph into a plurality of constant-depth layers; detecting repetition patterns of each constant-depth layer; and using the repetitions to enhance the 3D scan to generate a polygon-level 3D reconstruction.

4 Claims, 11 Drawing Sheets

(56) References Cited

OTHER PUBLICATIONS

SmartBoxes for interactive Urban reconstruction, Nan, No Date Was discovered.*
Zheng, Non-local Scan Consolication for 3D Urban Scenes.*
Allen, New Methods for Digotal Modeling of Historic Sites, 2003, IEEE.*
Aiger, 4points congruent Sets for robust Pairwise Surface Registration, 2008, ACM Siggraph.*
Debevec, Modeling and Rendering Architecture from Photographs, SIGGRAPH 1996.*
Huang, Consolidation of Unorganized point clouds for surface reconstruction, 2009.*
Jones, Non-Iterative, Feature preserving Mesh smoothing, 2004,MIT.*

* cited by examiner

METHOD FOR RECONSTRUCTION OF URBAN SCENES

BACKGROUND

1. Technical Field

The present disclosure relates generally to methods of image reconstruction that can reconstruction 3D urban models, and more particularly, to methods that can digital archival of existing urban.

2. Description of Related Art

In recent years, there has been an increasing interest in the modeling and reconstruction of digital urban scenes. There are two ways to obtain data, 2D photographs and 3D scans.

2D Photographs are of high resolution, easy to acquire, and dense, but view-dependent and inherently 2D, lacking in depth information. Image based modeling has been used to produce realistic 3D textured models with various degrees of manual assistance. However, even state-of-art image based modeling methods require significant user interaction to create models. Thus, the whole procedure is very laborious, time consuming.

On the other hand, 3D scans are coherent and inherently 3D, but are often sparse, noisy, and incomplete. The main difficulty with laser scans of large-scale urban environment data quality. Compared to photographs, acquired geometric data are already of much lower resolution. Large distances between the scanner and scanned objects also imply much reduced precision or higher level of noise. Although they provide a cursory impression of the scanned buildings, it is difficult to reconstruction urban models on it.

Typical urban scenes facades are, however, not planar. Even in a perfectly rectified photograph, repeated protruding elements may not appear as regularly spaced elements in image space. Thus, any global autocorrelation-based symmetry detection approach fails.

Therefore, there is room for improvement within the art.

SUMMARY OF THE INVENTION

It is the object of the invention to make available working at the level of each layer that enabling an autocorrelation-based approach to reliably extract repetitions, by replacing outlier region with reliable region from its corresponding self-similarity cluster to identify and cleanup occluded photograph regions.

An urban scenes reconstruction method includes: acquiring digital data of a three-dimensional subject, the digital data comprising a 2D photograph and a 3D scan; fusing the 3D scan and the 2D photograph to create a depth-augmented photograph; decomposing the depth-augmented photograph into a plurality of constant-depth layers; detecting repetition patterns of each constant-depth layer; and using the repetitions to enhance the 3D scan to generate a polygon-level 3D reconstruction.

Another urban scenes reconstruction method includes: acquiring a 3D scan of a three-dimensional subject; extracting a planar component form the 3D scan; extracting an edge segment of each planar component; snapping a SmartBox via data fitting and contextual term based on the edge segment, wherein the SmartBox is defined as a manipulated three-dimensional subject blocks; grouping a plurality of Smart-Boxes to form a compound SmartBox; dragging-and-dropping a SmartBox and acquiring an expected interval length, and predicting a position of another SmartBox; finding the optimal sizes and positions of the SmartBox via the predicted position; and copying the SmartBox to a next position thereof.

Yet another urban scenes reconstruction method includes: acquiring a 3D scan of a three-dimensional subject located on a terrain surface; identifying a root node of the three-dimensional subject, wherein the root node is defined as a intersection point between the three-dimensional subject and the terrain surface; removing all points of the terrain surface; initializing a Branch-Structure Graph (BSG) construction by connecting points of the 3D scan from the root node using Dijkstra's algorithm; refining the BSG to remove the noise and to construct a smooth BSG; inflating the BSG by computing a radius for each points of the BSG; and adding textures to the inflated BSG.

The present invention relates to a simple, automatic, yet effective urban scenes reconstruction method to enable realistic modeling, at a quality difficult to achieve with existing techniques without tedious manual intervention. Fusing 2D photograph to 3D scan creates a depth- and orientation-augmented photograph which helps to partition the 2D photograph into constant frontal layers. working at the level of constant frontal layer enable an autocorrelation-based approach to reliably extract repetitions.

BRIEF DESCRIPTION OF THE DRAWINGS

The components in the drawings are not necessarily drawn to scale, the emphasis instead being placed upon clearly illustrating the principles of the present disclosure.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
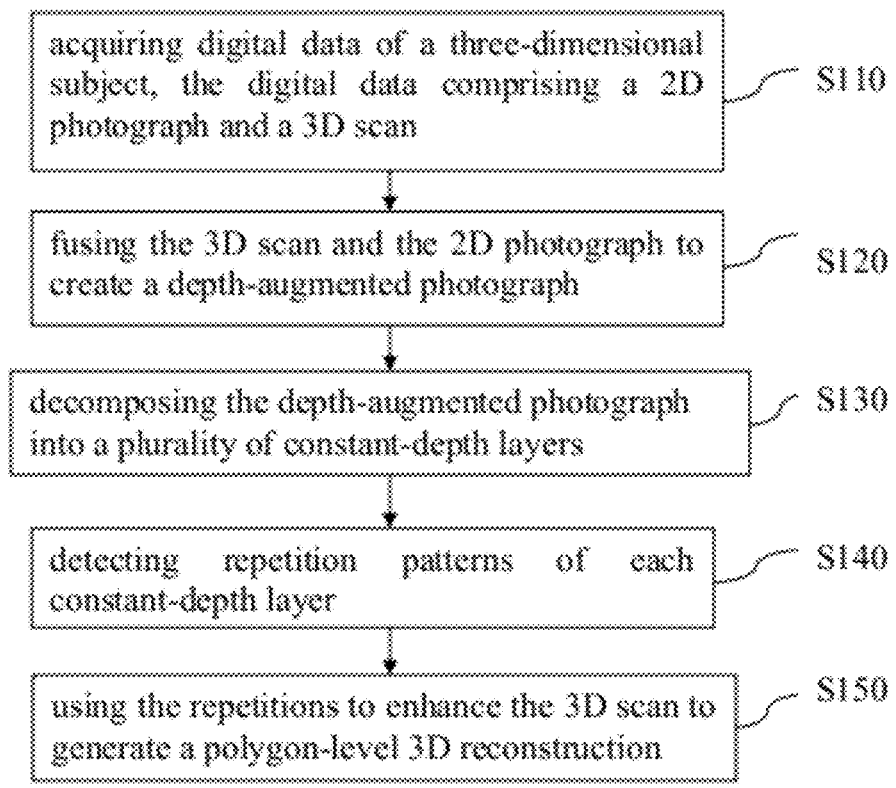
FIG. 1 is a flowchart of a first embodiment of an urban scenes reconstruction method.

Referring to FIG. 1, a first embodiment of an urban scenes reconstruction method is illustrated.

Figure 2:
FIG. 2 is a digital data of a building.

In step S110, digital data of a three-dimensional subject are acquired. As shown in FIG. 2, in this embodiment, the three-dimensional subject is a building. The digital data include a 2D photograph (referred as I hereafter) and a 3D scan (referred as s hereafter). The 2D photographs can be acquired by a common digital camera, and 3D scan can be acquired by a 3D scanner, preferably by a Light Detection and Ranging (LiDAR) scanner. The 3D scan is composed of a 3D point cloud.

Figure 3:
FIG. 3 shows the 2D photograph being over-segmented into fragments according to its color.

In step S120, the 3D scan and the 2D photograph are fused to create a depth-augmented photograph, and the photograph is then decomposed into a plurality of constant-depth layers. The 2D Photograph is of high resolution, easy to acquire, and dense, but view-dependent and inherently 2D, lacking in depth information. The 3D scan is coherent and inherently 3D, but they are often sparse, noisy, and incomplete. The two modalities are registered and the photograph is rectified. Typical building facades are, however, not planar. Even in a perfectly rectified photograph, repeated protruding elements like balconies may not appear as regularly spaced elements in image space. One aim to fuse the 3D scan and the 2D photograph is to create a depth- and orientation-augmented photograph. This fusion includes the following steps:

In step S121, referring to FIG. 3, the 2D photograph is over-segmented into fragments according to its color, assuming that each fragment is flat and can be associated with a single axial direction.

In step S122, a planar decomposition of the 3D point cloud is computed using Random Sample Consensus (RANSAC).

In step S123, each point is associated with one of the three main axial directions.

In step S124, the 3D points are then projected to "paint" the photograph I with orientation and depth information.

In step S125, a single axial direction of each fragment is determined using the direction of each point.

In step S130, the depth-augmented photograph is decomposed into a plurality of constant-depth layers. The diffusion of the depth data creates a depth- and orientation augmented photograph and acts as an enhanced model of the acquired data. The inferred depth information is used to partition the photograph I into constant-depth frontal layers $I_0, I_1, \ldots$.

Figure 4:
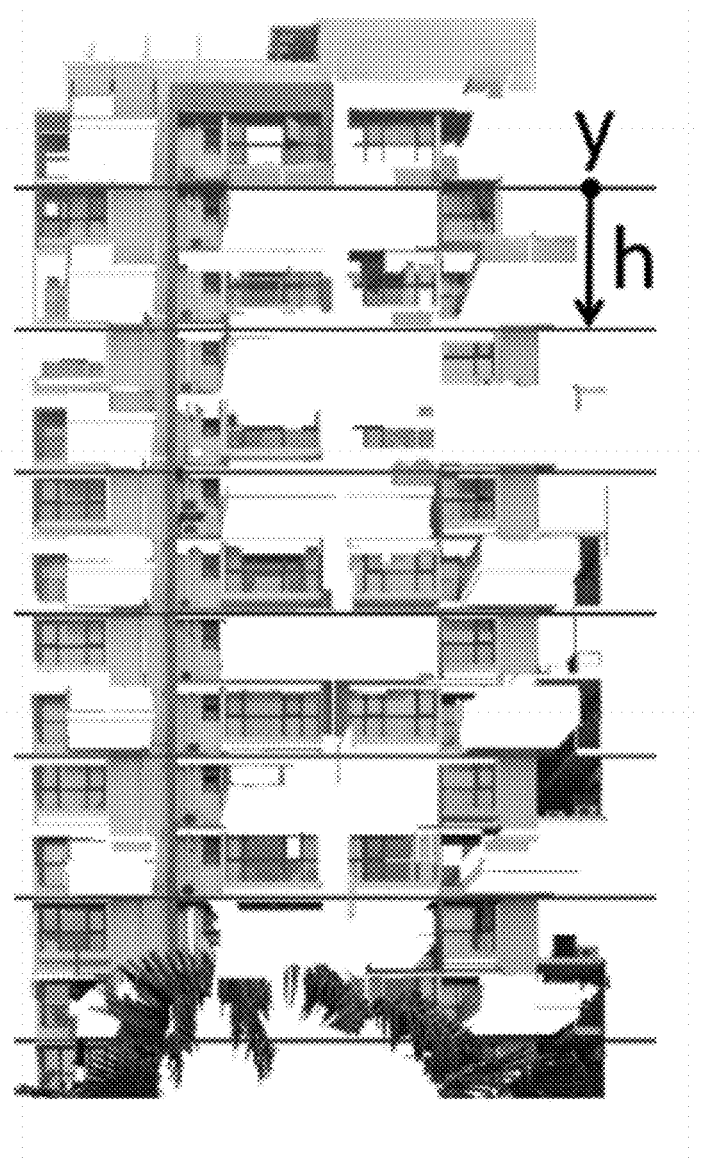
FIG. 4 shows repetition offset y and height h for one depth layer.

In step S140, repetition patterns of each constant-depth layer are detected. Dominant vertical and horizontal repetitive patterns are common in building facades. Based on this observation, a patch-based method is design to find the repetitions. The detection of the repetition patterns includes following steps: Referring FIG. 4, first, repetitions are detected in the vertical direction. In each layer $I_k$, an auto-correlation analysis is performed using image patches $B_j$ of height r, and a normalized cross-correlation is then used to estimate patch-level similarity scores. A building floor height is assumed to be in the range 2.5-3 m. The interval is mapped to pixel units using the estimated camera parameters, and the information is used as valid choices for r. The autocorrelation values are exhaustively computed. The distances are projected to a reference depth layer using the camera matrix, and the optimal repetition size is estimated by scores corresponding to auto-correlation peaks.

Figure 5:
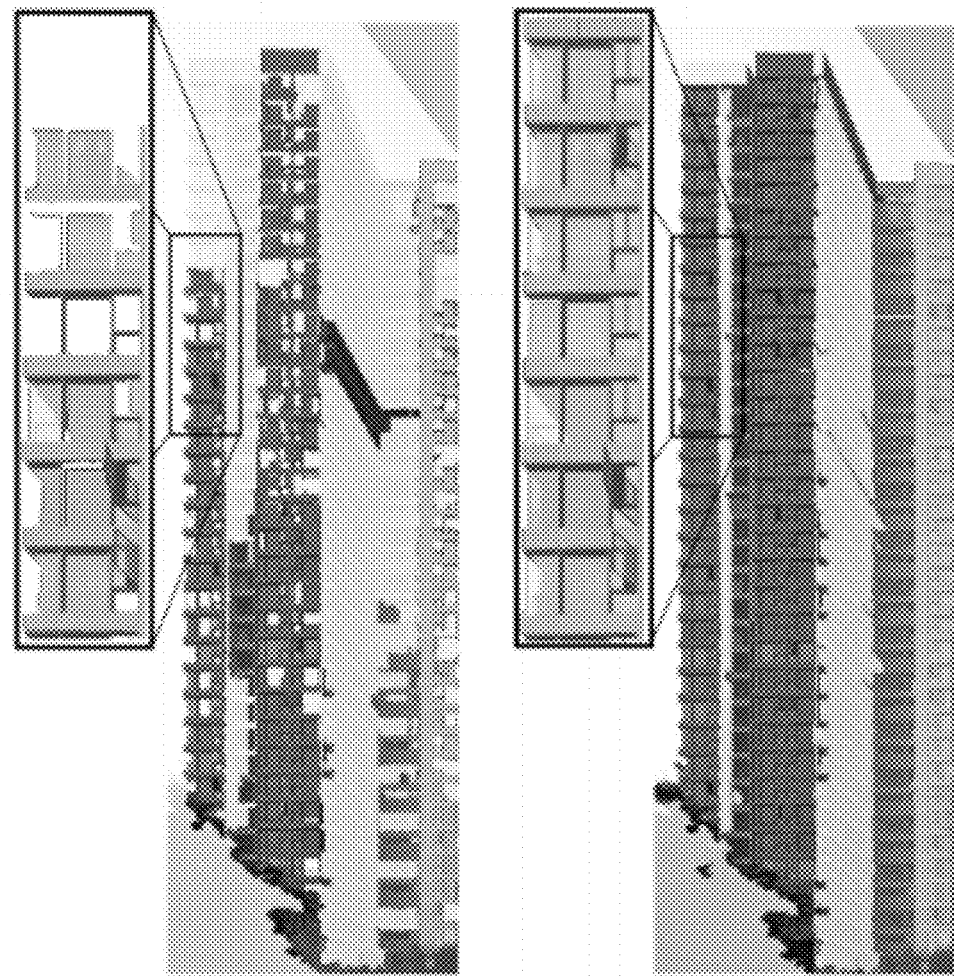
FIG. 5 shows initial depth information from 3D scans decomposing the image into partial layers (colored) to assist repetition detection.

In step S150, referring to FIG. 5, the repetitions is used to enhance the 3D scan to generate a polygon-level 3D reconstruction. Typical LiDAR data S has a reliable region and large missing regions, specially for tall buildings. Hence, a direct mapping of S onto I fails to assign depth values to large regions of the photograph. The detected repetitions, i.e. data redundancy, is exploited to address this problem. In each layer of the rectified image, we optimize over repetition number $n_0$ and offset distance $y_0$ to refine the extracted repetition information. Note that the detected repetitions from each layer $I_k$ yield different height and offset values, the estimated camera parameters is used to map back the image patterns to 3D, thus recovering true scale and positions, free of foreshortening artifacts. At the end of this stage, in each frontal vertical 3D plane of S, a partitioning of the points is obtained on the plane into groups of repeated elements.

The detected repetitions are used to enhance the scan S and depth-enriched image to generate a polygon-level 3D partial reconstruction. First, the 3D point cloud are enhanced by filling in missing regions by copying and translating data from reliable regions using the detected repetition pattern. Recall that the repetitions are detected from the high-resolution rectified photograph(s), and are more reliable than directly analyzing the sparse scan S. More specifically, in each depth layer, scan points are copied from the i-th repetition element at offset $y_i \leftarrow y_0 + i \cdot h$ to the j-th element at offset $y_i \leftarrow y_0 + i \cdot h$.

Next, a fusion step is performed by projecting the enhanced 3D points back onto the rectified image to refine the orientation and depth of over-segmented fragments, similar to the earlier projection step. The image-domain analysis helps to enrich the 3D point set, which in turn is used to refine the depth layer decomposition of the image.

The planar groups of point sets are then used to cut out the corresponding planes to create a polygonal scaffold for the building. More specifically, in each depth layer, rectangles are extracted in each repeating element, and then fuse across repetitions. For each element, a rectangular decomposition is computed, by overlaying the corresponding texture on a grid and extracting vertical and horizontal edges. Rectangles are sorted by their confidence defined as $c_i = \eta * \rho$, where $\eta$ denotes the number of points and $\rho$ denotes the point density of the region. Starting from the highest confidence rectangle, we examine its area and remove from the list the other rectangles that it covers. The process is continued until all regions are exhausted. Next, the repetition elements are translated to a common reference one, they are clustered based on their center locations and sizes, and in each cluster select the median element as the cluster representative. The textures are then mapped to the respective rectangle, and projected back on the 3D polygonal scaffold.

Figure 6:
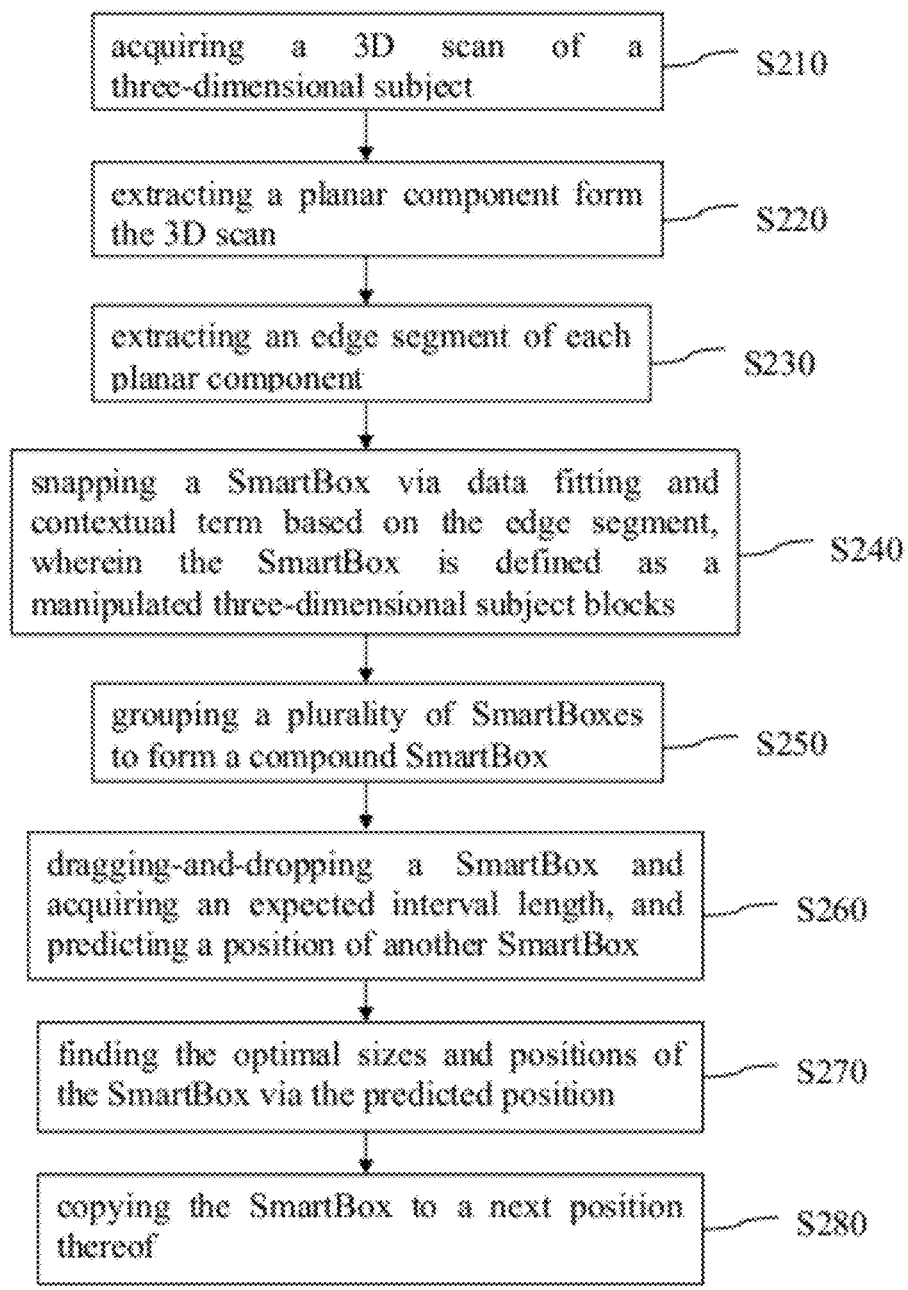
FIG. 6 is a flowchart of a second embodiment of an urban scenes reconstruction method.

Referring to FIG. 6, a second embodiment of an urban scenes reconstruction method is illustrated.

In step S210, a 3D scan of a three-dimensional subject is acquired. In this embodiment, the three-dimensional subject is a building. The 3D scan have been obtained from a 3D scanner mounted on a street-level vehicle. The 3D scanner captures a surrounding urban scene while the vehicle is moving at normal driving speed. Since the data is acquired from the street level, it is common that various occlusions would occur so that many parts of the building are far from being accurately captured. As well, the obtained scan data are typically quite noisy, with low resolutions, and outlier-ridden due to the presence of reflective objects such as windows and other glossy structures. To overcome such multitude of poor data qualities, user interaction becomes necessary. The user possesses certain domain knowledge about the modeled structures and can also be assisted by other cues such as those obtained from photometric images concurrently taken with the geometry scans.

In step S220, a planar component is extracted form the 3D scan using RANSAC. After planar detection, edge segments per planar is extracted in two steps. First, lines are extracted using a horizontal and vertical lines sweeping algorithm in the plane; the gradient extreme in the point distribution along the sweeps give extracted horizontal and vertical lines. The end points of the edge segments are then determined by a 1D version of the line sweeping along the corresponding lines.

In step S230, snapping a SmartBox via data fitting and contextual term based on the edge segment. SmartBox is an interactive tool for reconstructing architectural structures directly over a scanned point cloud. With the user providing loose guidance through several interactive operations, the tool automatically adjusts the sizes and positions of the building blocks on-the-fly to fit the given input data, respecting both data-fitting and contextual reconstruction criteria. Characteristics of architectural models including orthogonal and regularity have been accounted for in the design of SmartBoxes to take advantage of available data while allowing sensible reconstruction even over areas where the data is completely missing.

The basic primitive, the fundamental building block of the reconstruction, is a simple SmartBox, an axis-aligned rectangular cuboid uniquely specified by its center and a diagonal vector. To allow the modeling of more complex repeatable architectural structures, a compound SmartBox is defined as a set of simple SmartBoxes, not necessarily connected or adjacent, that are grouped and always act as an aggregate. While a compound SmartBox merely defines a logical relation, the system detects geometric and topological relations such as connectivity, intersections and alignment between the boxes in the compound. Regardless of the interactive operation, the fundamental computational task involves the determination of the parameters which define a SmartBox, either a simple or compound one, based on the given point cloud data and a subset of existing SmartBoxes. Through an optimization, the SmartBox is snapped by combining a data-fitting force and a contextual constraining force. These two forces constitute the terms of an objective function $M(B,\hat{B},P)$ for defining a SmartBox instance B over the given point cloud P in the context of a reference or contextual SmartBox $\hat{B}$. Since a compound SmartBox is merely an addition of simple boxes, the associated optimization simply uses a sum of the objective functions for the simple boxes.

Given a SmartBox B and the point cloud P, the data-fitting term measures the fitting of the facets and edges of B to points in P while accounting for an appropriate notion of confidence. The confidence value is intended to be correlated with data quality and it is defined at a point in the point cloud while considering the local neighborhood around the point.

The facet-fitting term F(B, P) measures a fitting of all facets f in B to points p in the data, $$F(B, P) = \sum_{p,f | dist(p,f) < \varepsilon} \frac{conf_p(P) \cdot (1 - dist(p, f)/\varepsilon)}{area(f)} \quad (1)$$

The confidence term $conf_P(\cdot)$ measures the local uniformity of the point cloud data near point p; it is computed by examining the local covariance matrices defined at p. Specifically, we compute for p the covariance matrices for its local neighborhood of points at three static scales. $conf_p(\cdot)$ is then an average of the ratios of the eigen values ($\lambda_2/\lambda_1$) of these matrices. Each eigen value ratio takes on a value between 0 to 1, correspondingly to a perfect line and disc distribution correspondingly.

The term dist(·) measures the Euclidean distance between a point and a facet. We consider only points that are ε-close to f, i.e., points p satisfying dist(p, f)<ε.

The confidence and area terms in (1) favor fitting to densely sampled uniform data regions, while the distance term favors fitting facets that are close to the point cloud. A higher value of F(B, P) signifies a better facet fitting. The main benefit offered by the confidence term arises when the data quality, in terms of point uniformity, is poor and the confidence value is low. In this case, the importance of face fitting is diminished so that other snapping forces, e.g., contextual or edge fitting, are allowed to play a more dominant role.

The edge-fitting term E(B, P) is defined similarly and measures a fitting of all edges e in B to a subset of points p0 in the point cloud P which belong to detected edge segments, $$E(B, P) = \sum_{p',e|dist(p',e)<\varepsilon} \frac{conf_E(p') \cdot (1 - dist(p', e)/\varepsilon)}{length(e)} \quad (2)$$

the data edge segments have been computed by observing sharp changes in point distribution along horizontal and vertical directions, yielding reasonably uniformly sampled edge segments. The confidence term is designated as $conf_E(\cdot)$ in the edge-fitting case at a point p' belonging to a data edge segment as the gradient of the point distribution at p'.

The term dist(·) in the edge-fitting case (2) measures the Euclidean distance between a point p' residing on a detected edge segment and an edge e in the SmartBox. In the same manner, we consider only ε-close points to edge e. The confidence and length terms favor fitting to densely sampled uniform edges, while the distance term favors fitting edges that are close to the point cloud edges. Again, a higher value of E(B, P) signifies a better edge fitting.

Both facet- and edge-fitting terms are normalized independently to the unit interval [0, 1] by recording the maximal and minimal values at each snapping operation. With an equally weighted combination for a minimization, the energy for data fitting is obtained as $$D(B, P) = 1 - \frac{1}{2}(F(B, P) + E(B, P)).$$

The contextual SmartBox $\hat{B}$ required to define the contextual force is a previously positioned SmartBox in a reconstruction sequence. The precise definition of context depends on the type of interaction performed. Given $\hat{B}$, the contextual term for snapping the SmartBox B is defined as the sum of three terms (in the case of compound SmartBoxes, B and $\hat{B}$ refer to the bounding box of the SmartBox for the interval and size measurements below):

The interval term $I(B, \hat{B})$ measures how well the interval length between B and $\hat{B}$ agrees with the expected interval length out of regularity constraints.

Δ is defined as the expected interval length for a vertical or horizontal box sequence, then $$I(B,\hat{B}) = |\|center(B) - center(\hat{B})\|_2 - \Delta|$$

The alignment term A(B, $\hat{B}$) measures how well corresponding edges of B and $\hat{B}$ align. $l_{ext}(e)$ is denoted as the line extension of an edge segment e, then the alignment term is a sum over the corresponding edge pairs, $$A(B,\hat{B}) = \sum_{\hat{e} \in \hat{B} \ and \ e \in B \ correspond} \|l_{ext}(\hat{e}) - l_{ext}(e)\|_2$$

The size term S(B, $\hat{B}$) measures the size difference between the boxes, $$S(B,\hat{B}) = max(diag(B)/diag(\hat{B}), diag(\hat{B})/diag(B)),$$

Where diag(B) is the length of the box diagonal.

Here again, the three terms are normalized independently to [0, 1] and arrive at a contextual energy term to be minimized, $$C(B, \dot{B}) = \frac{1}{3}(I(B, \dot{B}) + A(B, \dot{B}) + S(B, \dot{B})).$$

In step S240, a plurality of SmartBoxes are grouped to form a compound SmartBox. Grouping allows the user to select several SmartBoxes to form a compound SmartBox, which is always manipulated and transformed as a whole. The outcome of the operation is two-fold. First, it yields a logical grouping of the selected boxes allowing the creation of complex structures out of simple ones. By a logical grouping, we refer to the forming of only a symbolic link between the selected boxes, which are not physically connected. The second outcome is an automatic analysis of the grouped boxes to repair any inconsistencies among them.

By specifying that a set of boxes belong to a group, where the user intent is to have such a group represent a canonical architectural structure such as a balcony, a context is created. Such a context is respected by enforcing alignment among the grouped boxes which would resolve the kind of inconsistencies we wish to repair, e.g., box intersections, small gaps, and other forms of misalignments.

During grouping, the inconsistencies is repaired by clustering and aligning close to co-linear edge segments. Specifically, given a grouped compound of boxes, their edge segments are first clustered by orientation. Due to the assumption of in-plane dominant horizontal and vertical directions, all edge segments are axis aligned and grouping by orientation is straightforward. Among edges in an orientation group, they are further partitioned into co-linear edge clusters. This is achieved by projecting centers of edges with same orientation onto a perpendicular plane and perform clustering based on Euclidean distances between the projections in that plane. The centroid of each cluster of projections, along with the respective orientation, uniquely determine a representative line onto which the corresponding edges are projected; these edges are assumed to be co-linear within the group.

In step S250, a SmartBox is dragged-and-dropped and an expected interval length is acquired, and a position of another SmartBox is predicted. The essential interactive operation in the SmartBox tool is the drag-and-drop paradigm for creating complex structures through the propagation of a repeated structure, in our case, a SmartBox. The user selects a SmartBox and then drags-and-drops to a new target location in the vicinity. Similarly to the initialization of a simple box as described above, we apply the discrete optimization as described in the preceding section over the region of interest (ROI) defined by the drop operation. In this case, contextual information is utilized to define the candidate set since the drag-and-drop operation naturally implies a contextual relation between the original box and its copy. In particular, a sequence of drag-and-drop operations define an expected interval length Δ measuring the average of the interval lengths between consecutive SmartBox instances encountered along the sequence so far.

As the user performs drag-and-drop operations, contextual information is being formed and such information can assist in reconstruction even over areas where the data is highly sparse or completely missing. This is exploited in our design of the context-driven automatic continuation operation.

Specifically, each drag-and-drop operation performed by the user is tracked and analyzed. Continuation essentially computes an amortized drag-and-drop average by averaging the current drag-and-drop interval, size and direction with all the previous ones. Thus, the reconstruction is extended, following along the interval direction and distance, by copying the repetitive model to its next position. Once the next position is computed, its neighborhood is examined and find candidates as in the drag-and-drop step.

Figure 7:
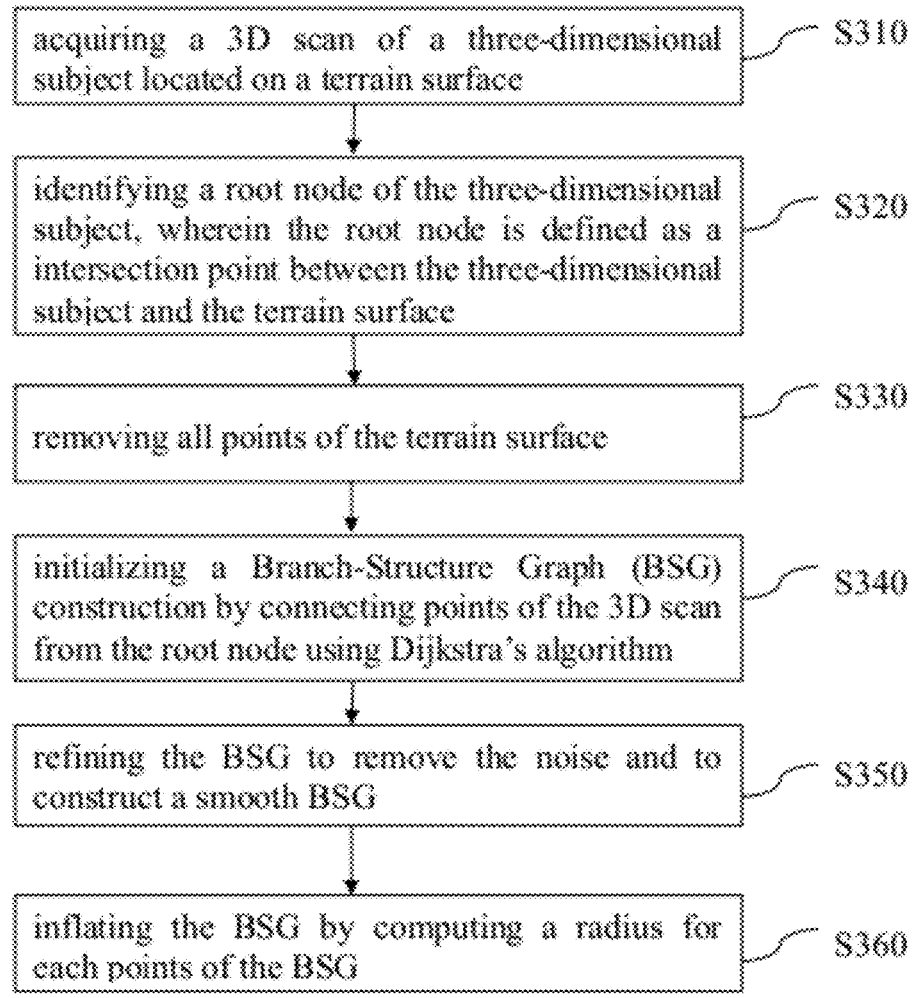
FIG. 7 is a flowchart of a third embodiment of an urban scenes reconstruction method.

Referring to FIG. 7, a third embodiment of urban scenes reconstruction method is illustrated.

Figure 8:
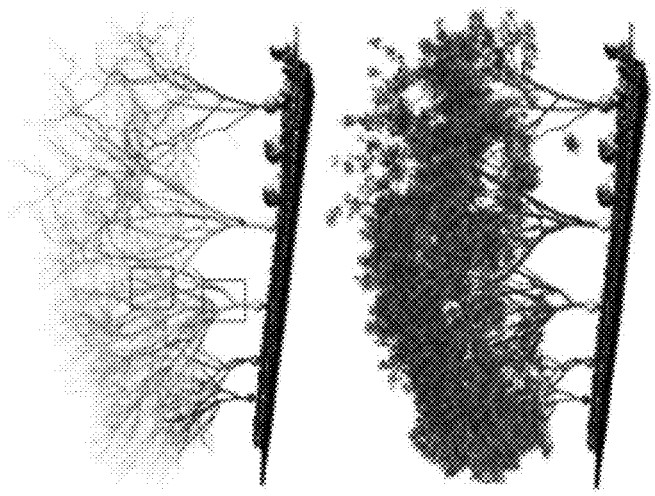
FIG. 8 shows a scene of trees automatically reconstructed by the algorithm.
Figure 8:
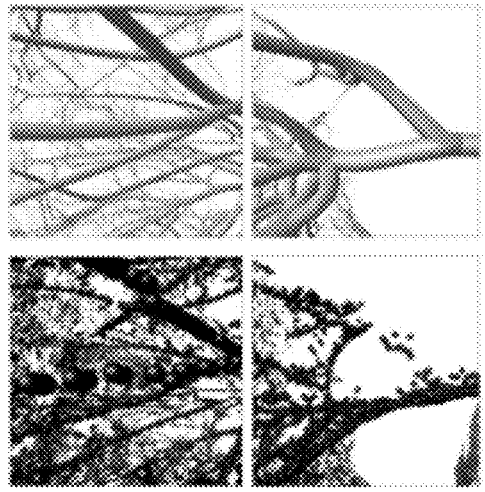
Figure 8:

In step S310, a 3D scan of a three-dimensional subject located on a terrain surface is acquired. As shown in FIG. 8, in this embodiment, the three-dimensional subject is a tree. Each reconstructed tree is described by Branch-Structure Graph (BSG). Given a laser scan of a scene with trees as input, the approximate skeletal geometry of the trees are first identified within the scene. Identifying samples is begun at the base of each tree, an initial approximation of the tree's BSG is built.

In step S320, a root node of the tree is identified. While accepting an arbitrary number of trees in our input point scan, a tree geometry is extracted and refined on a plant-by-plant basis. Therefore, the number and location of trees in the input is determined, root nodes for the BSGs representing each tree are identified.

Since most samples in a typical scan lie on the ground rather than on vegetation, the terrain surface is approximated by computing the centroid of point samples in a number of small regions, then a surface is fit through those points. This surface is swept along the y axis to identify clusters of points at the bases of plants. From each cluster, a single point is selected and marked as the root node of a BSG Finally, in step S330, all points on the terrain are removed from the dataset.

Figure 9:
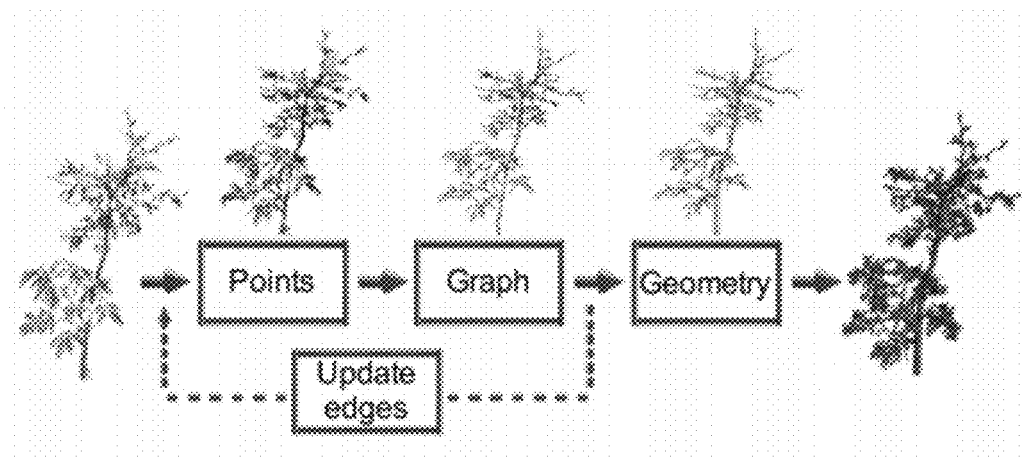
FIG. 9 shows a tree BSG reconstruction pipeline.

In step S340, referring to FIG. 9, a BSG construction is initialized. Minimum-weight spanning trees is constructed over the input point set P from the root nodes identified above. Over the majority of the scan, points that are close together are likely to belong to the same branch, and the tree structures are likely to be those with minimum overall edge length. Thus, a graph is constructed between input points with edges (u, v) weighted by the Euclidean distance $\|u-v\|^2$ and use Dijkstra's algorithm to extract a minimum weight spanning tree from this graph. To ensure that all root nodes are contained in this spanning tree, they are connected with temporary zero-weight edges, which are removed from the spanning tree to create a forest $\{T_1, \ldots, T_n\}$ of initial BSGs.

In step S350, BSG is refined to remove the noise and to construct a smooth BSG. The refinement includes:

In step S351, assigning importance weights to points of BSG. The importance weights are assigned to the vertices of the tree graphs to guide our optimization process. First and foremost, edges are connected to heavily-weighted vertices to form long, smooth branches. Short branches with low weight vertices near heavily-weighted samples indicate noise in the dataset. Furthermore, vertices on branches near the crown should have consistently low weights, resulting in the recovery of thin branches in the crown while similar branches at the trunk will be culled away.

To achieve these qualities, each vertex is assigned an importance weight given by the sum of edge lengths in its subtree. While apparently simple, this weight satisfies the critical properties listed above. In this scheme, adjacent vertices in $T_i$ with similarly large subtrees will tend to have similar weights, and the weight of a given vertex will be close to the sum of the weights of its children. Further, as it depends on a Euclidean distance measure, this weighting scheme is not sensitive to the density of input points.

In step S352, Given a vertex v∈$T_i$ with parent $v_p$, an orientation $o_v$ is found that minimizes the difference between the orientations of both vertices and between the orientation at v and the direction of the edge e(v, $v_p$). The first as $\Delta O(T_i)$ in Equation (I) and the second as $\Delta E(T_i)$ in Equation (II) are formulated.

$$\Delta O(T_i) = \sum_{v \in T_i} \left( \frac{c_{v_p} + c_v}{2} \|o_{v_p} - o_v\| \right)^2 \quad (I)$$

$$\Delta E(T_i) = \sum_{v \in T_i} \left( c_v \left\| o_v - \frac{e(v_p, v)}{\|e(v_p, v)\|} \right\| \right)^2 \quad (II)$$

where v denotes a vertex, v∈$T_i$; $v_p$ denotes a parent of v; $o_v$ denotes an orientation of v; $o_{v_p}$ and $o_v$ denote orientations of $v_p$ and v; $c_v$, $c_{v_p}$ denote the importance weights of v, $v_p$; $\Delta O(T_i)$ denotes a difference between the orientations of both points, $\Delta E(T_i)$ denotes a difference between the orientations of both points and between the orientations at v and the direction of the edge e(v,$v_p$).

Given these constraints, a smooth orientation field is construct that minimizes $\Delta O(T_i)+\Delta E(T_i)$. In both cases, the orientation contributions are weighted by the importance weights $c_v$, $c_{v_p}$ of the vertices involved. This ensures that short, noisy branches do not distort the orientation field near the trunk of the tree.

In step S353, BSG is refined using global BSG refinement. Having constructed a smooth orientation field over the vertices in $T_i$, the positions of those vertices are updated to reflect their orientations. Again, this optimization is performed by minimizing error functions. The graph is smooth by minimizing $\Delta A(T_i)$, the difference between the direction of an edge and the orientations of its neighbors. To ensure that the original geometry is not lost, this optimization is constrained by $\Delta F(T_i)$, the difference between original and final edge centers, $$\Delta A(T_i) = \sum_{e(u,v) \in T_i} \left( \frac{c_u + c_v}{2} \left\| (u' - v') - \frac{\|u - v\|(O_u + O_v)}{\|O_u + O_v\|} \right\| \right)^2 \quad (III)$$

$$\Delta F(T_i) = \sum_{e(u,v) \in T_i} \left( c_v \left\| \frac{u' + v'}{2} - \frac{u + v}{2} \right\| \right)^2 \quad (IV)$$

where v denotes a vertex belong to $T_i$, $v_p$ denotes its parent, $o_v$ denotes an orientation that minimizes the difference between the orientations of both vertices and between the orientations at v and the direction of the edge e(v, $v_p$), $c_v$, $c_{vp}$ denotes the weight of v,$v_p$. The updated vertex position is found by minimizing $\Delta A(T_i)+\Delta F(T_i)$,
and again the importance weights described above is incorporated. The resulting graph exhibits a smooth structure.

In step S354, BSG construction is iterated. After constructing and refining a tree's BSG the process is repeated and a new initial BSG is built. using information from the previous iteration. A method similar to mean shift belief propagation method is used to update the squared-distance weights used by Dijkstra's algorithm. For each edge.

Figure 10:
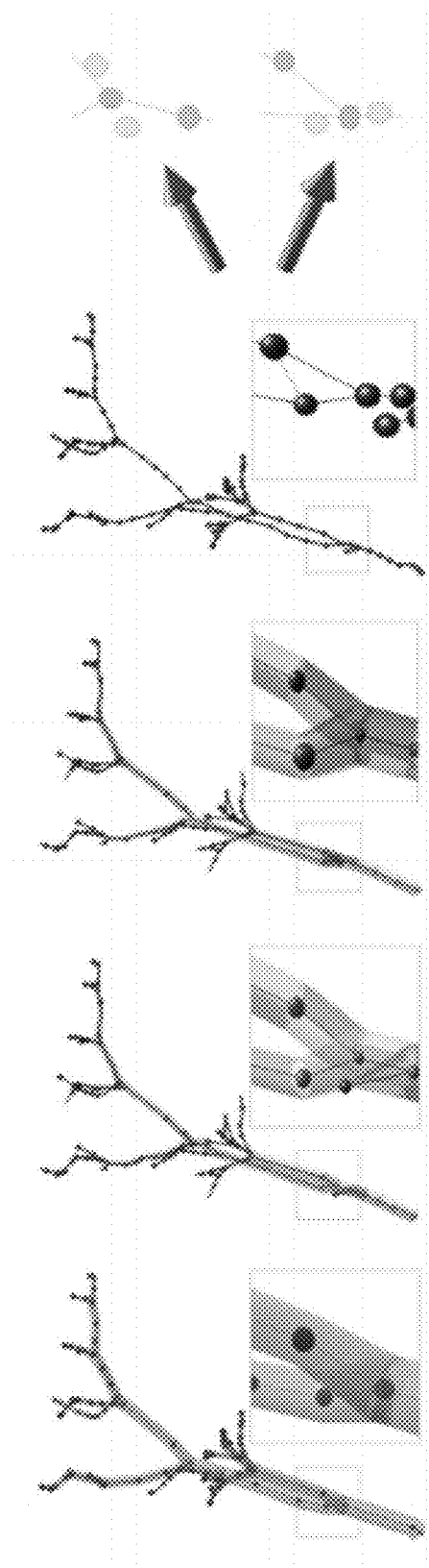
FIG. 10 shows steps of the geometry construction process.

In step S360, the BSG is inflated by computing a radius for each points of the BSG. Since a BSG for each tree with vertices weighted by importance and optimized to produce long is constructed, the tree's geometry is reconstructed from its BSG and unnecessary branches are removed. The inflation of the BSG includes following steps:

In step S361, referring to FIG. 10, geometry is reconstructed. First, a radius is computed for each vertex in $T_i'$. Each vertex is assigned a radius proportional to its importance weight using allometric theory.

In step S362, the radius of adjacent vertices are constrained by the radio expressed below:

$$r_{u'} = \left(\frac{c_u}{c_v}\right)^{2.5} r_{v'} \quad (V)$$

Where v denotes a vertex, v∈$T_i$; v' denotes an updated position of v; u denotes another vertex, u∈$T_i$; u' denotes an updated position of u $c_v$, $c_u$ denote the importance weights of v, u; $r_u$, denotes a radius of u'; $r_{v'}$ denotes a radius of v'.

In step S363, to ensures continuity between the radius of parent and children vertices, over the whole tree, this is represented by the constraint $\Delta R(T_i')$ below:

$$\Delta R(T_i') = \sum_{u',v' \in T_i'} \left| r_{u'} - \left(\frac{c_u}{c_v}\right) r_{v'} \right|^2 \quad (VI)$$

where u, v denotes adjacent vertices, $c_u$, $c_v$ denotes their weights, $r_{u'}$, $c_{v'}$ denotes the radius of vertices.

In step S364, to ensure that neither occlusions nor the distribution of points in the input produce artifacts in the computed radius. The vertex radius is constrained by below:

$$\Delta D(T_i') = \left( \sum_{v' \in T_i'} c_v r_{v'} \right)^2 - \left( d_{avg} \sum_{v' \in T_i'} c_v \right)^2 \quad (VII)$$

The average radius is close to $d_{avg}$, the average distance between the sample and the edges in $T'_i$. Then, the radius is assigned by minimizing $\Delta R(T_i')+\Delta D(T'_i)$, and the contribution of each vertex is weighted by its importance weight. This result in small radius on spurious branches near the root of the tree. This property is used to cull such vertices.

Figure 11:
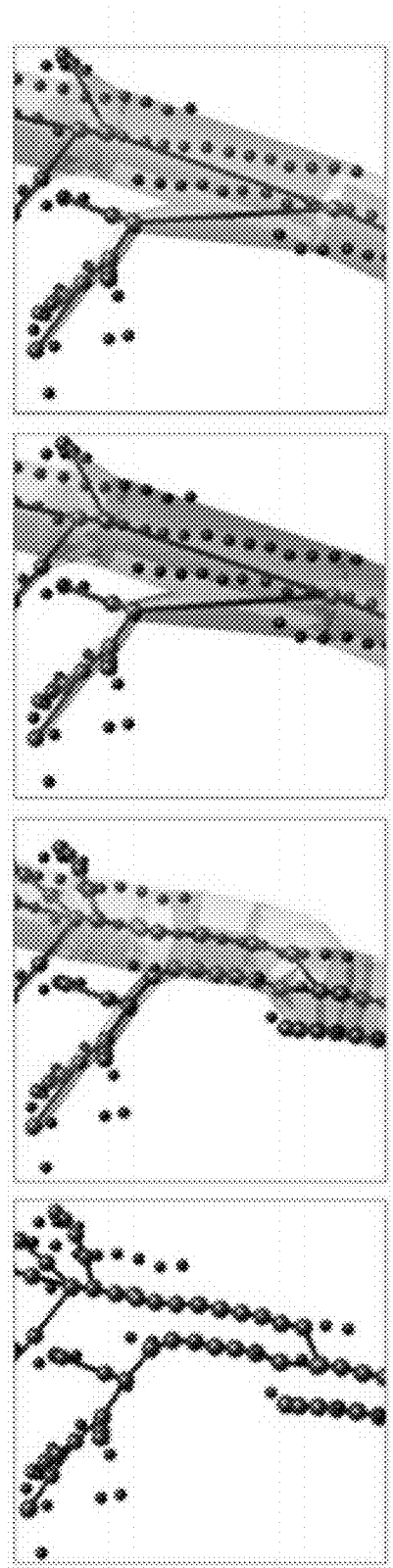
FIG. 11 shows snapshots of the edge-removal process.

In step S365, referring to FIG. 11, edges are removed. The geometry is represented by a set of generalized cylinders. Once these cylinders is obtained, the edges with negligible contribution is removed by computing the intersection of their generalized cylinders with those of other edges on the same parent vertex. If the volume of this intersection exceeds 50% of the volume from the edge itself, the offending edge is simply collapsed. Similarly, vertices are removed when their adjacent edges share similar orientations and radius. If v is a vertex with parent u and one child ω, the edge (v,w) is collapse, if the volume of a new edge (u, v+(v−u)) intersects more than half of (v, w). In either case, an edge is collapsed by inserting a new vertex at the weighted midpoint ($c_u$u+$c_v$v)/($c_u$+$c_v$). Clustering stops when no further edges can be collapsed. When the radius of cylinders are small, as at the crown of the BSG little overlap occurs even when the edges are dense. However, at the trunk where radius are large, trunk geometry intersects spurious edges in dense regions and only main branches survive clustering.

In step S370, textures are added to the inflated BSG. Having reconstructed the major components of the tree, the fine branches is synthesize, the branches with leaves are synthesized and the textures are added. To grow fine branches, L-system rule is extracted and used from the BSG as in. Leaves are created next to each leaf node in the BSG. A random number of leaves are generated (between 20 and 50), with positions randomly chosen in a sphere centered on leaf node. At the end, the textures is added to geometry to enhance visual appeal.

Although the invention has been described in language specific to structural features and/or methodological acts, it is to be understood that the invention defined in the appended claims is not necessarily limited to the specific features or acts described. Rather, the specific features and acts are disclosed as sample forms of implementing the claimed invention.

What is claimed is:

1. An urban scenes reconstruction method, comprising:
   acquiring a 3D scan of a three-dimensional subject;
   extracting a plurality of planar components from the 3D scan;
   extracting an edge segment of each planar component;
   establishing a plurality of three-dimensional subject blocks via data fitting and contextual term based on the edge segment;
   selectively grouping a portion of the plurality of three-dimensional subject blocks based on one of a logical attribute or a physical attribute, to form a compound three-dimensional subject block where the grouped portion of the plurality of three-dimensional subject blocks are manipulated and transformed as one;
   dragging-and-dropping one of the three-dimensional subject blocks and establishing an interval length between that one three-dimensional subject block and an adjacent three-dimensional subject block in one of two orthogonal directions based on regularity constraints, determining an interval length of the one three-dimensional subject block and an adjacent three-dimensional subject block, and predicting a position of another three-dimensional subject block based on a difference between the established interval length and the determined interval length; finding an optimal sizes and positions of further of the plurality of three-dimensional subject blocks via the predicted position thereof; and
   copying a further three-dimensional subject block to a next of the positions found.

2. The method as claim 1, wherein extraction of the edge segment comprises:
   extracting lines using a horizontal and vertical line sweeping algorithm in a plane defined by the planar component;
   computing a gradient in a point distribution along sweeps of the horizontal and vertical line sweeping algorithm;
   determining end points of the edge segments by sweeping along the corresponding lines.

3. The method as claim 1, wherein data fitting measures a fitting of the facets and edges of three-dimensional subject block to points in a point cloud while accounting for confidence value; the confidence value is defined at a point in the point cloud while considering a local neighborhood around the point.

4. The method as claim 1, wherein the contextual term for snapping the three-dimensional subject block is defined as the sum of three terms: a interval term, an alignment term, and a size term.

* * * * *

UNITED STATES PATENT AND TRADEMARK OFFICE
CERTIFICATE OF CORRECTION

PATENT NO. : 8,718,393 B2  
APPLICATION NO. : 12/935685  
DATED : May 6, 2014  
INVENTOR(S) : Baoquan Chen, Liangliang Nan and Qian Zheng Page 1 of 1

It is certified that error appears in the above-identified patent and that said Letters Patent is hereby corrected as shown below:

ITEM [86] OF TITLE PAGE:
DELETE THE PCT APPLICATION SERIAL NUMBER "PCT/CN2010/007552" AND INSERT THE PCT APPLICATION SERIAL NUMBER --PCT/CN2010/075524--

Signed and Sealed this  
Sixteenth Day of December, 2014

Michelle K. Lee  
*Deputy Director of the United States Patent and Trademark Office*